(12) United States Patent
Feng et al.

(10) Patent No.: US 8,360,575 B2
(45) Date of Patent: Jan. 29, 2013

(54) EYEGLASSES AND LENS FOR SAME

(75) Inventors: Jun-Bo Feng, Beijing (CN); Qun-Qing Li, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 100 days.

(21) Appl. No.: 12/965,851

(22) Filed: Dec. 11, 2010

(65) Prior Publication Data

US 2012/0075582 A1  Mar. 29, 2012

(30) Foreign Application Priority Data

Sep. 28, 2010  (CN) .......................... 2010 1 0294970

(51) Int. Cl.
*G02C 7/10* (2006.01)

(52) U.S. Cl. .............................. 351/159.65; 351/159.56
(58) Field of Classification Search .................... 351/49, 351/159.6–159.65, 159.01
See application file for complete search history.

(56) References Cited

U.S. PATENT DOCUMENTS

2008/0239489 A1*  10/2008  Feng et al. ..................... 359/492
2010/0091236 A1*   4/2010  Matera et al. ................... 351/49

FOREIGN PATENT DOCUMENTS

CN          101276012         10/2008

* cited by examiner

*Primary Examiner* — Darryl J Collins
(74) *Attorney, Agent, or Firm* — Altis Law Group, Inc.

(57) ABSTRACT

A lens for eyeglasses includes a substrate and at least one carbon nanotube (CNT) film including a number of CNTs. The substrate includes a surface, or defines at least one cavity. The at least one CNT film is disposed on the surface of the substrate, or embedded in the at least one cavity of the substrate such that a part of light is absorbed by the CNTs of the CNT film.

14 Claims, 8 Drawing Sheets

EYEGLASSES AND LENS FOR SAME

BACKGROUND

1. Technical Field

The present disclosure relates to eyeglasses and a lens for the same that absorbs most visible light, infrared light, or ultraviolet light.

2. Description of Related Art

There is increasing awareness of the damage being done to human skin and eyes from unprotected exposure to the sun. Concerns about exposure to ultraviolet light in particular have heightened, due to concerns about damage to the ozone layer. Exposure to the sun naturally occurs in many outdoor sports, such as golf, tennis, fishing, and bicycling. Additionally, many people simply enjoy relaxing outdoors in the sun.

When someone is sunbathing or engaging in an activity which will result in significant exposure to solar light, the person may make suitable preparations, such as wearing sunglasses and using sunscreen to protect the eyes and skin.

However, sunglasses have been traditionally designed for absorbing particular wavelengths of solar light and prevent a small proportion of glare such that the efficiency of eye protection is not sufficient to decrease the probability of damage to the eyes.

Thus, there remains a need to produce eyeglasses that can absorb most wavelengths of solar light and prevent a large proportion of glare.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
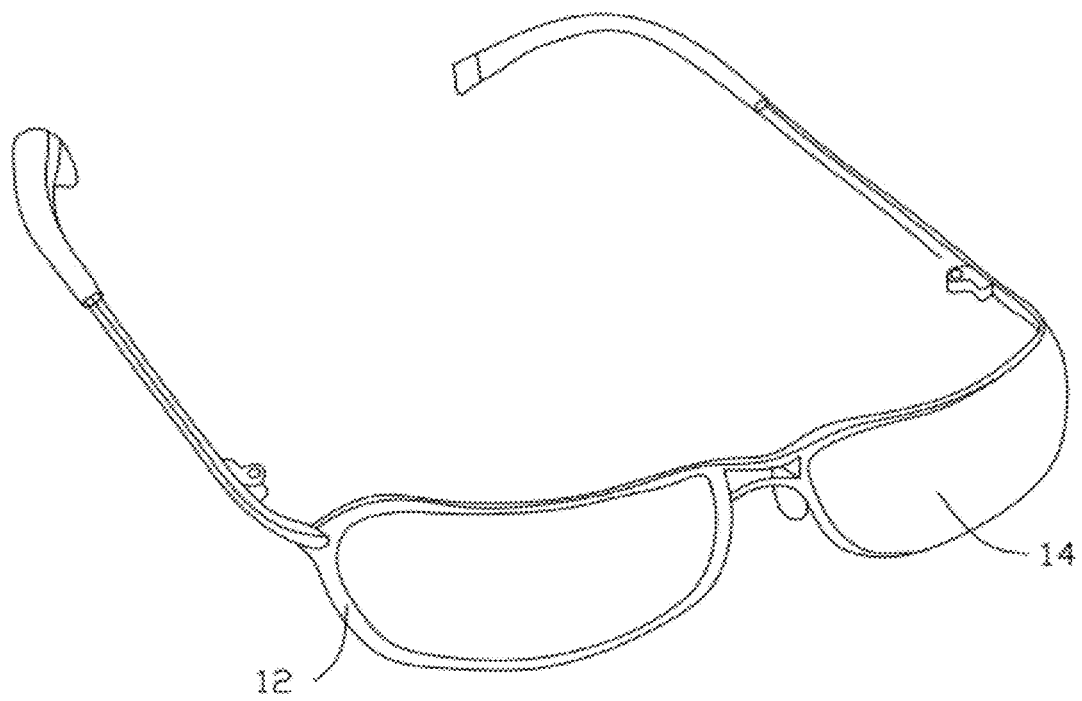
FIG. 1 is a schematic view of an embodiment of a pair of eyeglasses.
Figure 2:
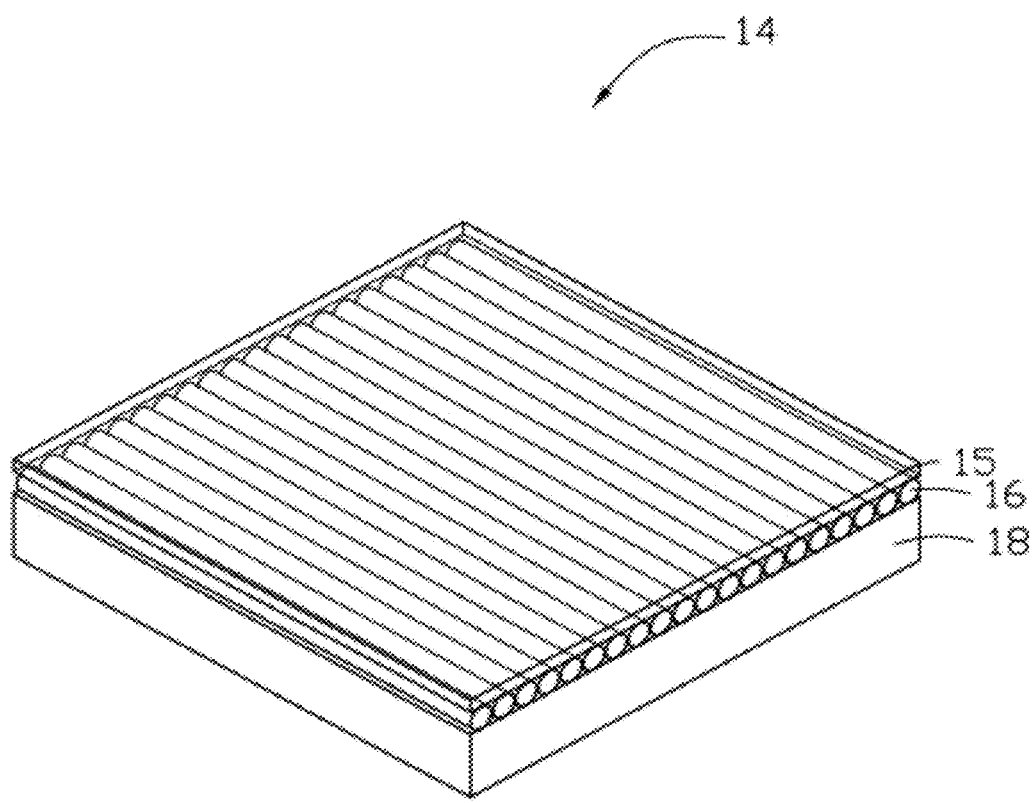
FIGS. 2, 3 and 4 are cross-sectional views of embodiments of a lens of the eyeglasses shown in FIG. 1.
Figure 3:
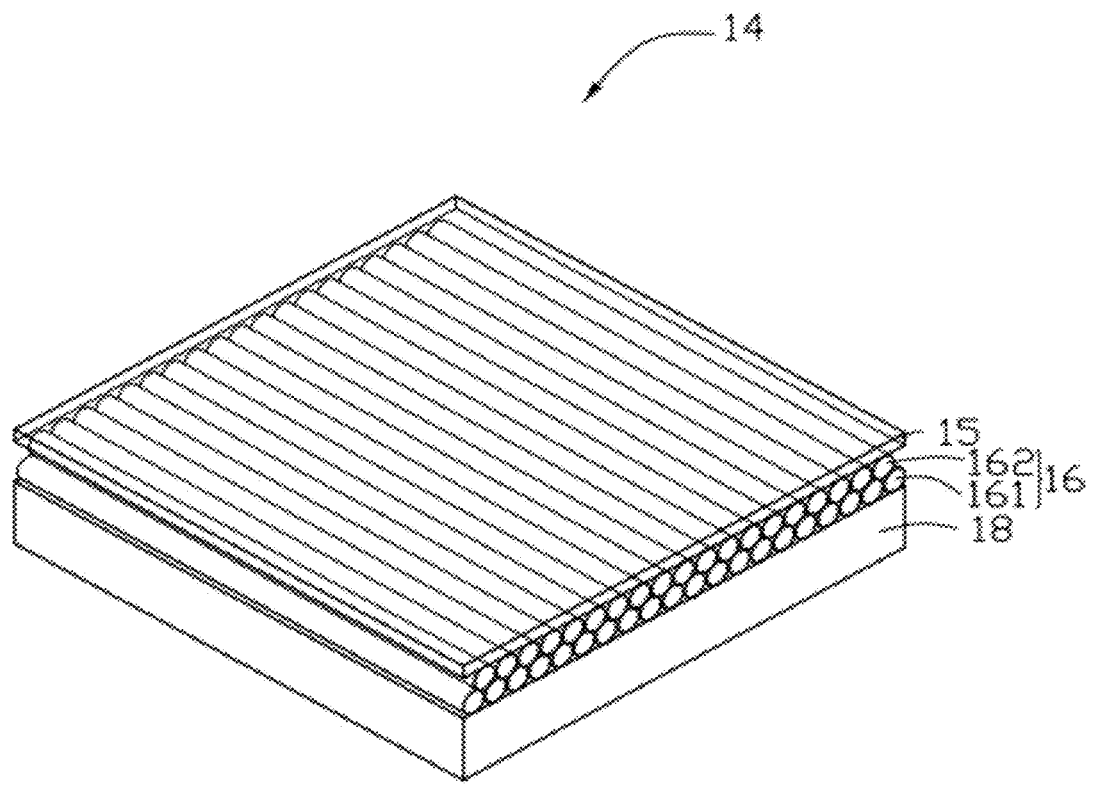
Figure 4:
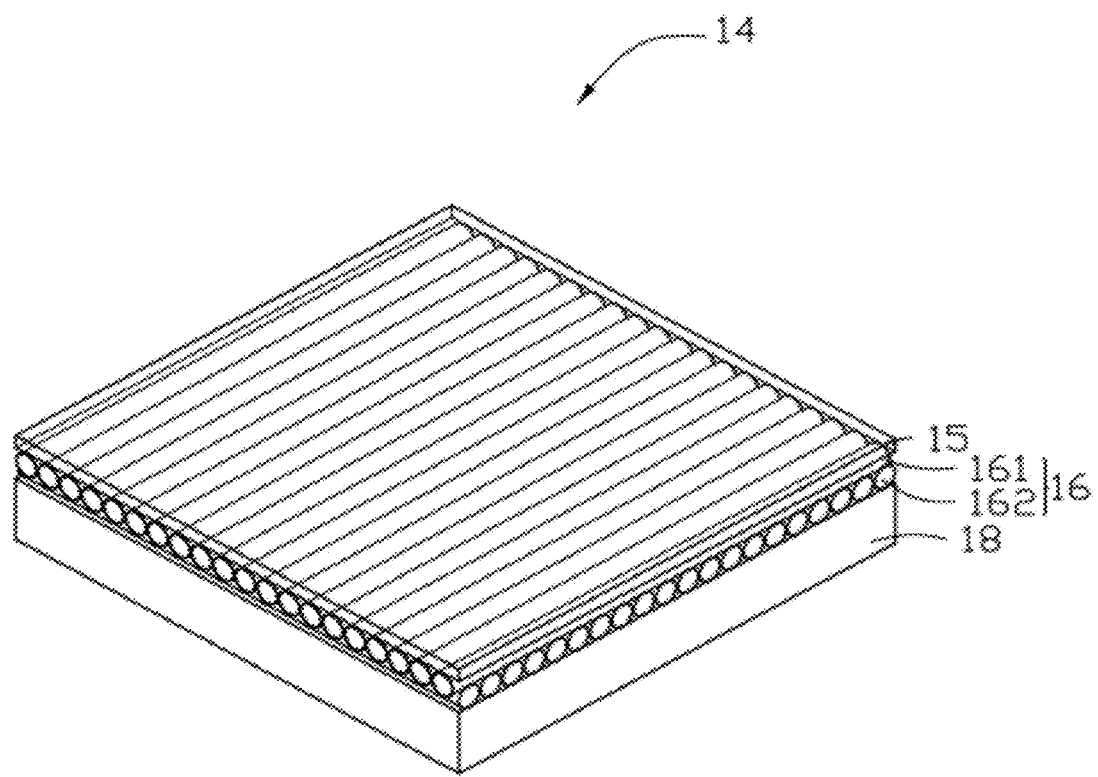

According to an embodiment, a pair of eyeglasses 10 as illustrated in FIG. 1 comprises a frame 12 and two lenses 14. FIGS. 2, 3, and 4 are cross-sectional views of embodiments of a lens 14 of the pair of eyeglasses 10 shown in FIG. 1. As shown in FIG. 2, the lens 14 comprises a cover layer 15, a substrate 18, and a CNT film 16 sandwiched between the substrate 18 and the cover layer 15. The CNT film 16 comprises a plurality of carbon nanotubes (CNTs) extending substantially along a direction is disposed on a surface of the substrate 18. The CNTs can absorb a part of visible light, infrared light, ultraviolet light (UVA and UVB), or any combination thereof.

Referring to FIG. 3 and FIG. 4, the lens 14 comprises a cover layer 15, a substrate 18, and a CNT film 16. The CNT film 16 consists of a first CNT film 161 and a second CNT film 162. The first CNT film 161 comprises a plurality of first carbon nanotubes extending substantially along a first direction. The second CNT film 162 comprises a plurality of second carbon nanotubes extending substantially along a second direction. As shown in FIG. 3, the first direction and the second direction are substantially parallel. Alternatively, as shown in FIG. 4, the first direction and the second direction are substantially perpendicular.

In the embodiment, the cover layer 15 is fabricated using a transparent high polymer material, such as epoxy resin, with a thickness of about 200 micrometers ($\mu m$) to prevent damage of the CNT film 16. However, in other embodiments, the cover layer 15 can be fabricated using other transparent high polymer materials, such as cellulose, polyethylene terephthalate (PET), acrylic resin, polyethylene (PE), polypropylene (PP), polystyrene (PS), polyvinylchloride (PVC), Bakelite, silica gel, polyester, or any combination thereof.

Similarly, the substrate 18 is fabricated using a transparent high polymer material, such as polymethyl methacrylate (PMMA), with a thickness of about 1.2 millimeters (mm) to support the CNT film 16. However, in other embodiments, the thickness of the substrate 18 can be in a range from about 0.5 mm to about 3 mm, and the substrate 18 can be fabricated using other transparent high polymer materials, such as glass, polyethylene, polystyrene, polycarbonate (PC), polyethylene terephthalate, benzocyclobutene (BCB), or any combination thereof. Accordingly, transparency of the substrate 18 is about 92%.

The CNT film 16 of the lens 14 can consist of a plurality of CNT films. A number of the CNT films can be in a range from 1 to 12, thus a thickness of the CNT film 16 can be in a range from about 0.5 nanometers (nm) to about 100 $\mu m$. A degree of polarization of the lens 14 is in a range from about 0.2 to about 0.98. Visible light absorptance of the lens 14 is in a range from about 15% to about 80%, infrared light absorptance is in a range from about 15% to about 80%, and ultraviolet light absorptance is in a range from about 50% to about 90%. In the embodiment, the number of the CNT films is 10, while the thickness of the CNT film 16 is about 10 $\mu m$. Thus, the degree of polarization of the lens 14 is greater than 0.95, the visible light absorptance and the infrared light absorptance of the lens 14 are about 75%, and the ultraviolet light absorptance of the lens 14 is about 90%.

Figure 5:
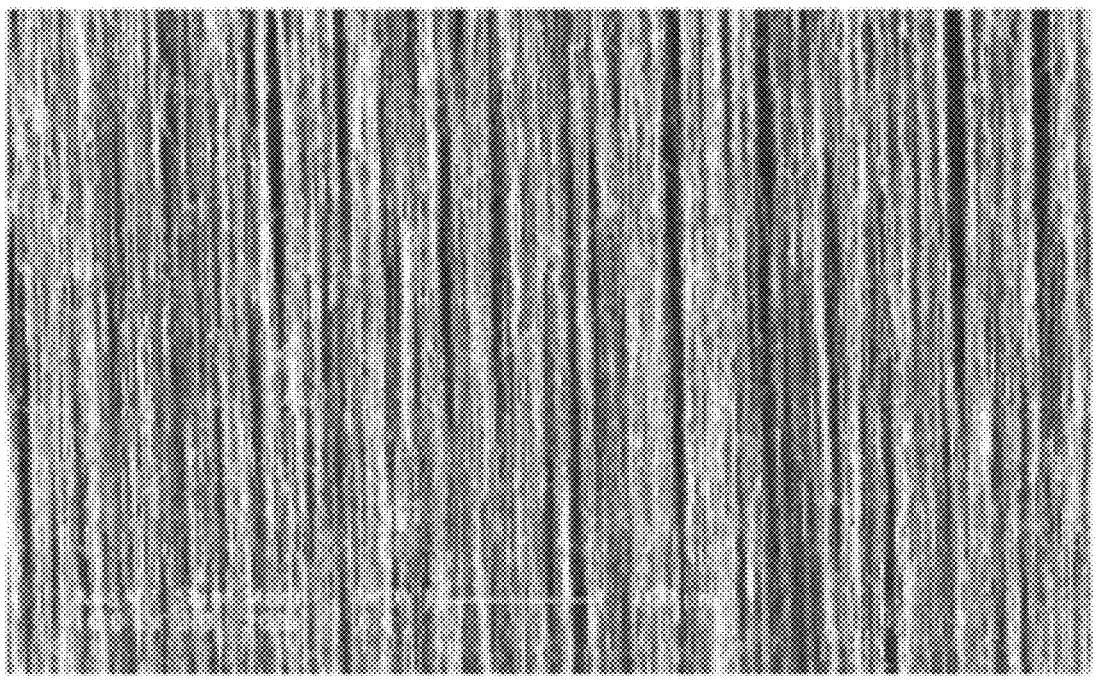
FIG. 5 shows a Scanning Electron Microscope (SEM) image of a carbon nanotube (CNT) film comprising a plurality of carbon nanotubes.

Referring to FIG. 5, the CNT film 16 includes a plurality of carbon nanotubes and has a free-standing structure. The term "free-standing structure" means that the CNT film 16 can sustain the weight of itself when it is hoisted by a portion thereof without any significant damage to its structural integrity. So, if the CNT film 16 is placed between two separate supports, a portion of the CNT film 16 not in contact with the two supports would be suspended between the two supports and maintain film structural integrity.

More specifically, a large number of the carbon nanotubes in the CNT film 16 can be oriented along a preferred direction, meaning that a large number of the carbon nanotubes in the CNT film 16 are arranged substantially along the same direction and substantially parallel to the surface of the CNT film 16. An end of one carbon nanotube is joined to another end of an adjacent carbon nanotube arranged substantially along the same direction by van der Waals attractive force. A small number of the carbon nanotubes are randomly arranged in the CNT film 16, and have a small if not negligible effect on the larger number of the carbon nanotubes in the CNT film 16 arranged substantially along the same direction.

The carbon nanotubes in the CNT film 16 can be single-walled carbon nanotubes, double-walled carbon nanotubes, multi-walled carbon nanotubes, or any combination thereof. The diameter of the single-walled carbon nanotubes is in a range from about 0.5 nm to about 10 nm, the diameter of the double-walled carbon nanotubes is in a range from about 1 nm to about 15 nm, and the diameter of the multi-walled carbon nanotubes is in a range from about 1.5 nm to about 50 nm. The length of the carbon nanotubes is greater than 50 μm.

A method for making the CNT film 16 includes: (a) selecting a carbon nanotube segment having a predetermined width from a carbon nanotube array; and (b) pulling the carbon nanotube segment at an even/uniform speed to achieve a uniform drawn CNT film. The pulling/drawing can be done by using a tool (e.g., adhesive tape, pliers, tweezers, or another tool allowing multiple carbon nanotubes to be gripped and pulled simultaneously).

Figure 6:
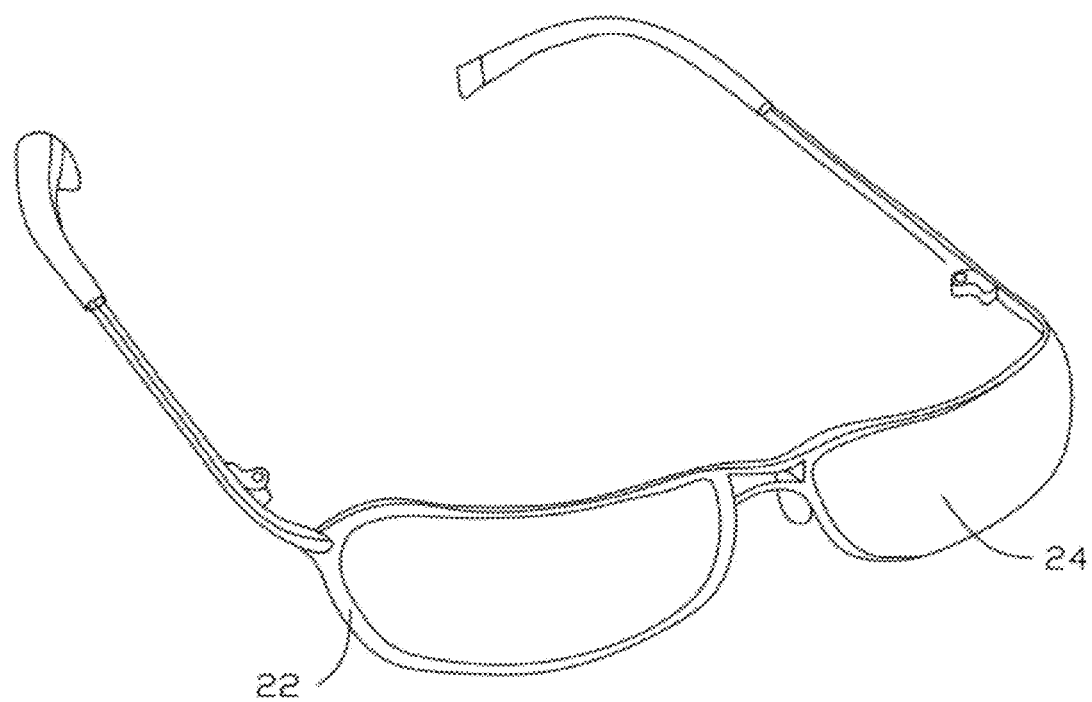
FIG. 6 is a schematic view of another embodiment of a pair of eyeglasses.

According to another embodiment of a pair of eyeglasses 20 as illustrated in FIG. 6 comprises a frame 22 and two lenses 24.

Figure 7:
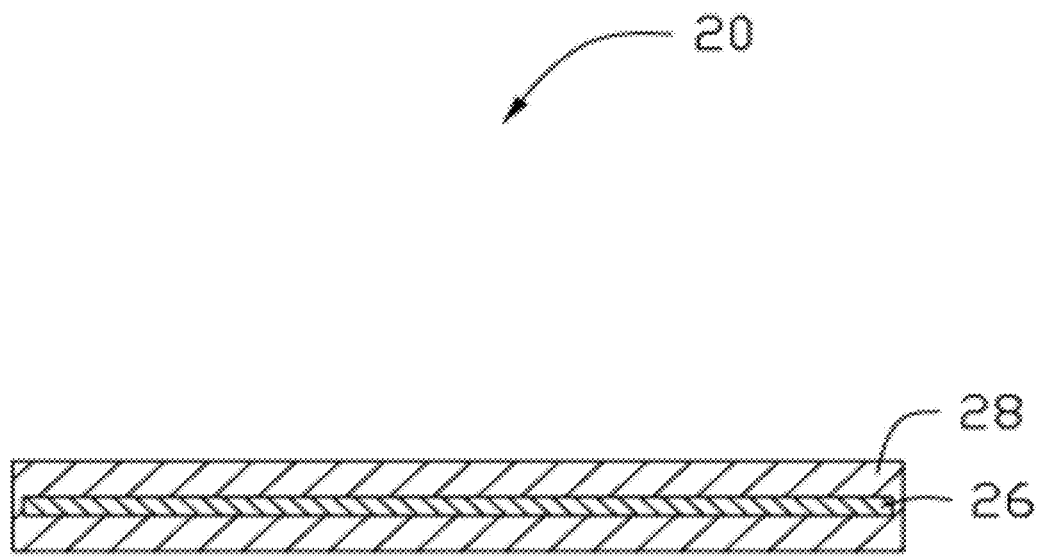
FIGS. 7 and 8 are cross-sectional views of embodiments of a lens of the eyeglasses shown in FIG. 6.
Figure 8:
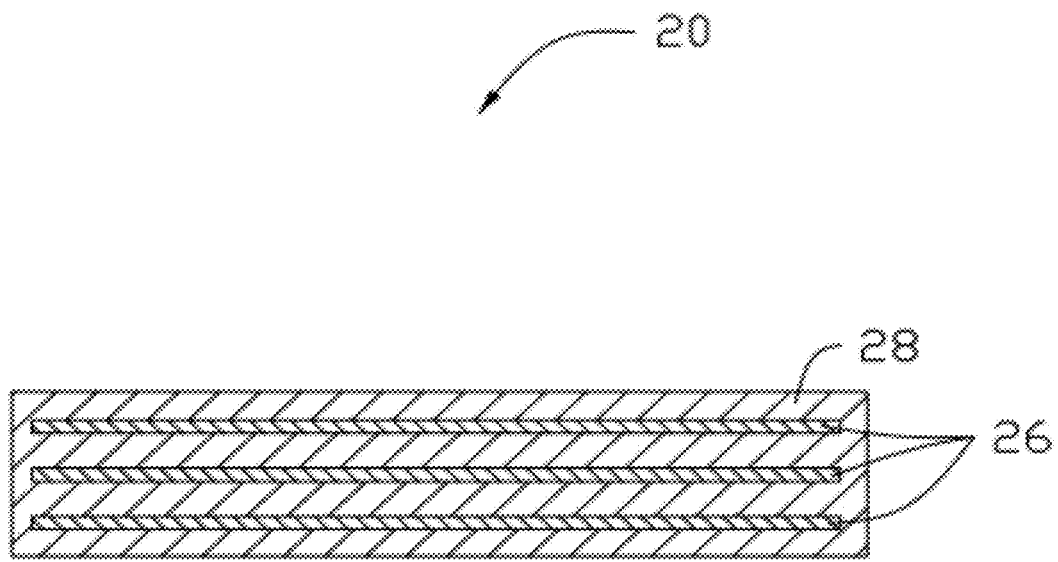

FIGS. 7 and 8 are cross-sectional views of embodiments of a lens 24 of the pair of eyeglasses 20 shown in FIG. 6. As shown in FIG. 6, the lens 24 comprises a substrate 28 and a CNT film 26. The substrate 28 defines a cavity. The CNT film 26 embedded in the cavity of the substrate 28 can absorb a part of the visible light, infrared light, ultraviolet light, or any combination thereof. Thus, the lens 24 eliminates a cover layer.

Referring to FIG. 8, the lens 24 comprises a substrate 28 and a plurality of CNT films 26. The substrate 28 defines a plurality of cavities. The number of the CNT films is the same as the number of the cavities of the substrate 28. The CNT films are respectively embedded in the cavities of the substrate 28. In the second embodiment, two adjacent CNT films comprise a plurality of carbon nanotubes extending substantially along a direction. However, in other embodiments, two adjacent CNT films can individually comprise a plurality of carbon nanotubes extending substantially along different directions.

Accordingly, the present disclosure provides a pair of eyeglasses and a lens for the same. Because the lens comprises one or more CNT films, the CNT films can efficiently absorb a large proportion of glare, visible light, infrared light, and ultraviolet light. In addition, the CNT films have high strength and toughness. Accordingly, the strength of the lens increases. Thus, lenses with CNT films can be manufactured into a pair of eyeglasses with omnibus light absorbing ability and high strength.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A lens for a pair of eyeglasses, comprising:
   a substrate with a surface; and
   at least one CNT film disposed on the surface of the substrate, the at least one CNT film absorbing a part of light, wherein the light is visible light, infrared light, ultraviolet light, or any combination thereof, visible light absorptance of the lens is in a range from about 15% to about 80%, and infrared light absorptance of the lens is in a range from about 15% to about 80%.

2. The lens as claimed in claim 1, further comprising a cover layer disposed on the at least one CNT film such that the at least one CNT film is sandwiched between the substrate and the cover layer.

3. The lens as claimed in claim 1, wherein the at least one CNT film comprises a plurality of carbon nanotubes (CNTs) extending substantially along a direction.

4. The lens as claimed in claim 1, wherein a degree of polarization of the lens is in a range from about 0.2 to about 0.95.

5. The lens as claimed in claim 1, wherein the at least one CNT film comprises at least one first CNT film comprising a plurality of first carbon nanotubes extending substantially along a first direction and at least one second CNT film comprising a plurality of second carbon nanotubes extending substantially along a second direction.

6. The lens as claimed in claim 5, wherein the first direction and the second direction are substantially parallel.

7. The lens as claimed in claim 5, wherein the first direction and the second direction are substantially perpendicular.

8. The lens as claimed in claim 1, wherein the at least one CNT film comprises a plurality of CNT films, and a number of the CNT films is in a range from 1 to 12.

9. A lens for a pair of eyeglasses, comprising:
   a substrate with a surface; and
   ten CNT films disposed on the surface of the substrate, the ten CNT films absorbing a part of light,
   wherein the light is visible light, infrared light, ultraviolet light, or any combination thereof, a degree of polarization of the lens is about 0.95, visible light absorptance of the lens is about 75%, infrared light absorptance of the lens is about 75%, and ultraviolet light absorptance of the lens is about 90%.

10. The lens as claimed in claim 9, further comprising a cover layer disposed on the ten CNT films such that the ten CNT films are sandwiched between the substrate and the cover layer.

11. The lens as claimed in claim 9, wherein the ten CNT films comprise a plurality of carbon nanotubes (CNTs) extending substantially along a direction.

12. The lens as claimed in claim 9, wherein the ten CNT films comprise at least one first CNT film comprising a plurality of first carbon nanotubes extending substantially along a first direction and at least one second CNT film comprising a plurality of second carbon nanotubes extending substantially along a second direction.

13. The lens as claimed in claim 12, wherein the first direction and the second direction are substantially parallel.

14. The lens as claimed in claim 12, wherein the first direction and the second direction are substantially perpendicular.

* * * * *